United States Patent

[11] 3,594,563

[72] Inventor Everett R. Bishop
  Waynesboro, Va.
[21] Appl. No. 749,032
[22] Filed July 31, 1968
[45] Patented July 20, 1971
[73] Assignee General Electric Company

[54] NUMERICAL CONTROL SYSTEM HAVING IMPROVED MEANS FOR COUNTING IN OFFSETS
15 Claims, 3 Drawing Figs.

[52] U.S. Cl. .................................................. 235/151.11,
  318/443, 318/444, 318/572, 318/600
[51] Int. Cl. .......................................................... G05b 19/24,
  G12b 13/00
[50] Field of Search ........................................ 235/151.11;
  318/20.120, 20.310, 443, 444

[56] References Cited
UNITED STATES PATENTS
3,400,314 9/1968 Wilson ......................... 235/151.11 X
3,453,549 7/1969 Payne et al. .................. 318/20.120 X

*Primary Examiner*—Malcolm A. Morrison
*Assistant Examiner*—R. Stephen Dildine, Jr.
*Attorneys*—Frank L. Neuhauser, Oscar B. Waddell, William S. Wolfe, Gerald R. Woods and Joseph B. Forman ABSTRACT: A new and improved numerical control system is described which has an offset value count-in control means for adjusting the current value of an offset being used by the numerical control system to a new value by counting into the system a count indicative of the magnitude and polarity of the difference between the existing offset value currently employed by the numerical control system and the desired new offset value. The offset value count-in control means comprises reversible counter means for storing data indicative of a current offset value being employed by the numerical control system. A comparator is provided having a first input coupled to a value indicating output from the reversible counter and having a second input supplied with data indicative of a new or input offset value. The comparator serves to compare the existing offset values set into the reversible counter to the new or input offset value and to derive a count-adjusting output signal indicative of the magnitude and polarity of any difference. Means are provided for feeding the count-adjusting output signal derived from the comparator back to a count-adjusting input to the reversible counter for adjusting the count contained in the reversible counter to a value corresponding to the new or input offset value. Means are also provided for supplying this count-adjusting output signal from the comparator to the numerical control system for adjusting the offset value being employed by the numerical control system to the new or input offset value.

INVENTOR.
EVERETT R. BISHOP
BY Michael Masnik

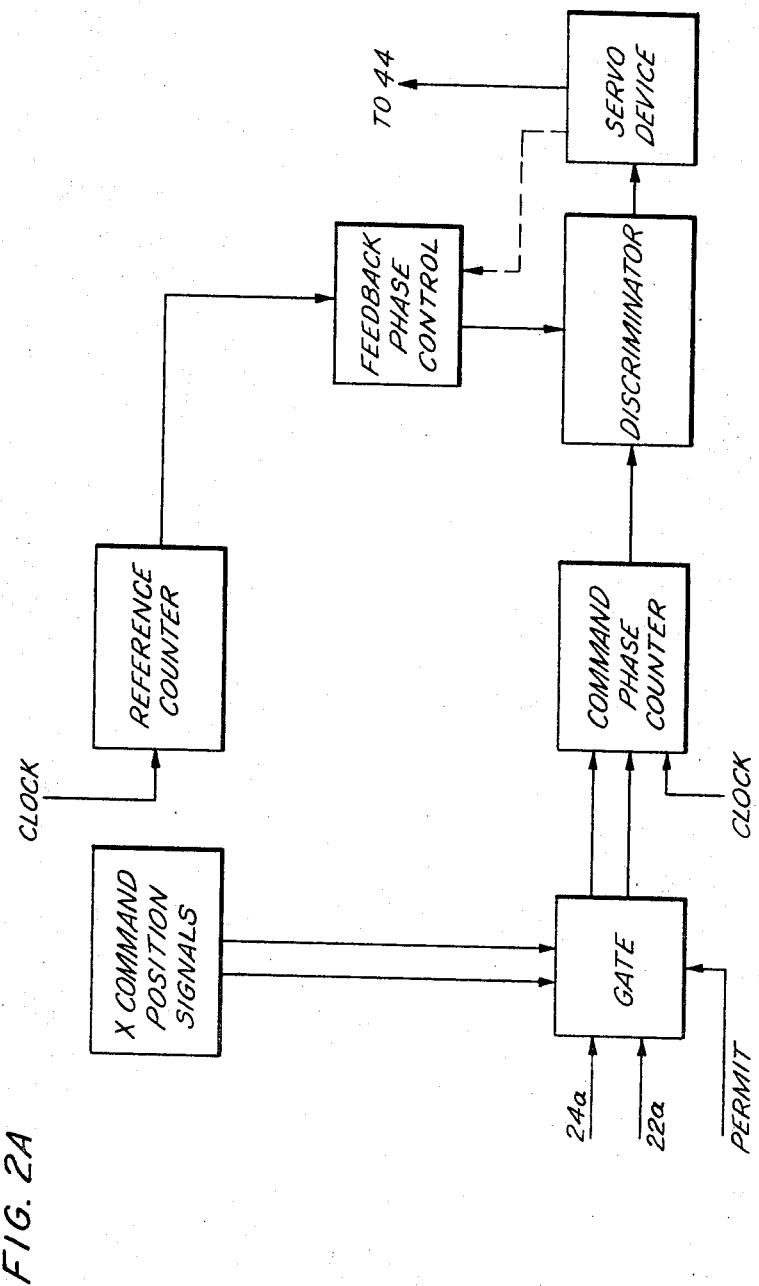

INVENTOR.
EVERETT R. BISHOP

NUMERICAL CONTROL SYSTEM HAVING IMPROVED MEANS FOR COUNTING IN OFFSETS

BACKGROUND OF INVENTION

1. Field of Invention

This invention relates to numerical control systems of the type for automatically controlling the operations of a machine tool.

More particularly, the invention relates to a numerical control system having a new and improved offset value count-in control for adjusting the current value of an offset being used by the numerical control system to a new or input value by counting into the system a count indicative of the magnitude and polarity of any difference between the existing offset value currently being used by the numerical control system and the desired new or input offset value.

2. Prior Art Problem

Many machining operations that currently are being performed by automatic machine tools controlled by numerical control systems, require offsets due to variations in tool lengths, tool radius, temperature changes, accuracy compensation, etc. Since the value of an offset being employed by an automatic machine tool can and does change due to external influences, it is desired to keep the offset information updated at all times in order to obtain maximum practical accuracy, and to do so with a minimum equipment requirement, cost, downtime of the machine while the offset value is being corrected, etc.

The system of offsets heretofore used in conjunction with known numerical control systems with incremental feedback, required that the old offset information be counted out of the numerical control systems storage and the new information counted in. It was necessary to do this on some periodic basis whether or not the offset information changed. It also required that some external command initiate the sequence. These requirements together with the time factor involved in counting out the old offset information and counting in the new, necessarily limited this approach to applications involving only slowly changing variables.

The present invention provides a means for reading in only the difference between two offset values into a numerical control system in a minimum time period with a relatively low cost, minimum amount of equipment and without requiring any external inputs to command the system to correct itself. In effect, the invention makes it possible for a numerical control system to be able at all times to check a stored offset value against a desired input value, to determine whether or not a change is required, and if a change is called for, to make the necessary change.

SUMMARY OF INVENTION

It is therefore a primary object of the invention to provide a new and improved numerical control system and offset value count-in control therefor, for adjusting the current working value of an offset being used by the numerical control system against an input value, and for counting into the system a count indicative of the magnitude and polarity of any difference between the existing offset value currently being used by the numerical control system and the desired input offset value.

In practicing the invention, a new and improved numerical control system is provided for automatically controlling a process in response to input data command signals. This new and improved numerical control system includes an offset value count-in control means for adjusting the current value of an offset being used by the numerical control system to a new value by counting into the system a count indicative of the magnitude and polarity of the difference between the existing offset value currently employed by the numerical control system and the desired new or input offset value. The offset value count-in control means comprises reversible counter means for storing data indicative of a current offset value being employed by the numerical control system. The count-in control means further includes comparator means having a first input coupled to a value indicating output from the reversible counter means, and having a second input coupled to a means (such as thumbwheel switches) for supplying data indicative of a new offset value. The comparator means serves to compare the existing offset value set into the reversible counter means to the new or input offset value supplied by the thumbwheel switches, and to derive a count-adjusting output signal indicative of the magnitude and polarity of any difference. Means are provided for feeding the count-adjusting output signal from the comparator means back to a count-adjusting input to the reversible counter for adjusting the count contained in the reversible counter to a value corresponding to the new or input offset value. Means are also provided for supplying the count-adjusting output signal from the comparator means to the numerical control system for adjusting the offset value being employed by such systems to the new offset value.

BRIEF DESCRIPTION OF THE DRAWINGS

Other objects, features and many of the attendant advantages of this invention will be appreciated more readily as the same becomes better understood by reference to the following detailed description, when considered in connection with the accompanying drawing, and wherein:

FIGS. 2A and 2B show positioning numerical control systems. DETAILED DESCRIPTION OF PREFERRED EMBODIMENT A new and improved numerical control system including an offset value count-in control constructed in accordance with the invention, is shown in FIG. 1 of the drawings. In FIG. 1, a standard numerical control system is shown at 11 and comprises a conventional, commercially available numerical control system with incremental feedback such as described in U.S. Pat. No. 3,120,603 issued Feb. 4, 1964 to J. E. Jones for an "Automatic Control Apparatus" — assigned to the General Electric Co. Connected to the standard numerical control system 11 is a new and improved offset value count-in control circuit means 12 constructed in accordance with the invention. The offset value count-in control circuit means 12 is comprised generally by a plurality of reversible counters 13a, 13b and 13c which are interconnected in a conventional manner to comprise a three decade reversible counter. The necessary interconnections between each of the decade stages 13a through 13c have not been illustrated in order to simplify the drawings. The reversible counters 13a—13c may be comprised by a conventional reversible counter such as that shown in FIG. 13 of the above-identified U.S. Pat. No. 3,120,603. The reversible counter decade stages 13a—13c have their value indicating outputs shown as 0.01, 0.02, 0.04 —2, 4, 8 connected to one set of input terminals of a three-stage bit comparator shown at 14a, 14b and 14c. The bit comparators 14a—14c may comprise any conventional comparator circuit means such as that illustrated in FIG. 12 of the above-referenced U.S. Pat. No. 3,120,603 and each of the comparator stages has a second set of input terminals connected to the output from an associated decade thumbwheel switch 15a, 15b and 15c. The decade, thumbwheel switches, 15a—15c are conventional, commercially available items for developing binary-coded decimal digit value signals whose value represents a particular decimal value of an input offset to be read into the standard numerical control system 11. The particular arrangement shown in FIG. 1 utilizes 1-2-4-8 coded reversible counters and bit comparators as well as thumbwheel switches; however, this particular coding arrangement is not essential and some other coding arrangement could be employed.

Figure 1:
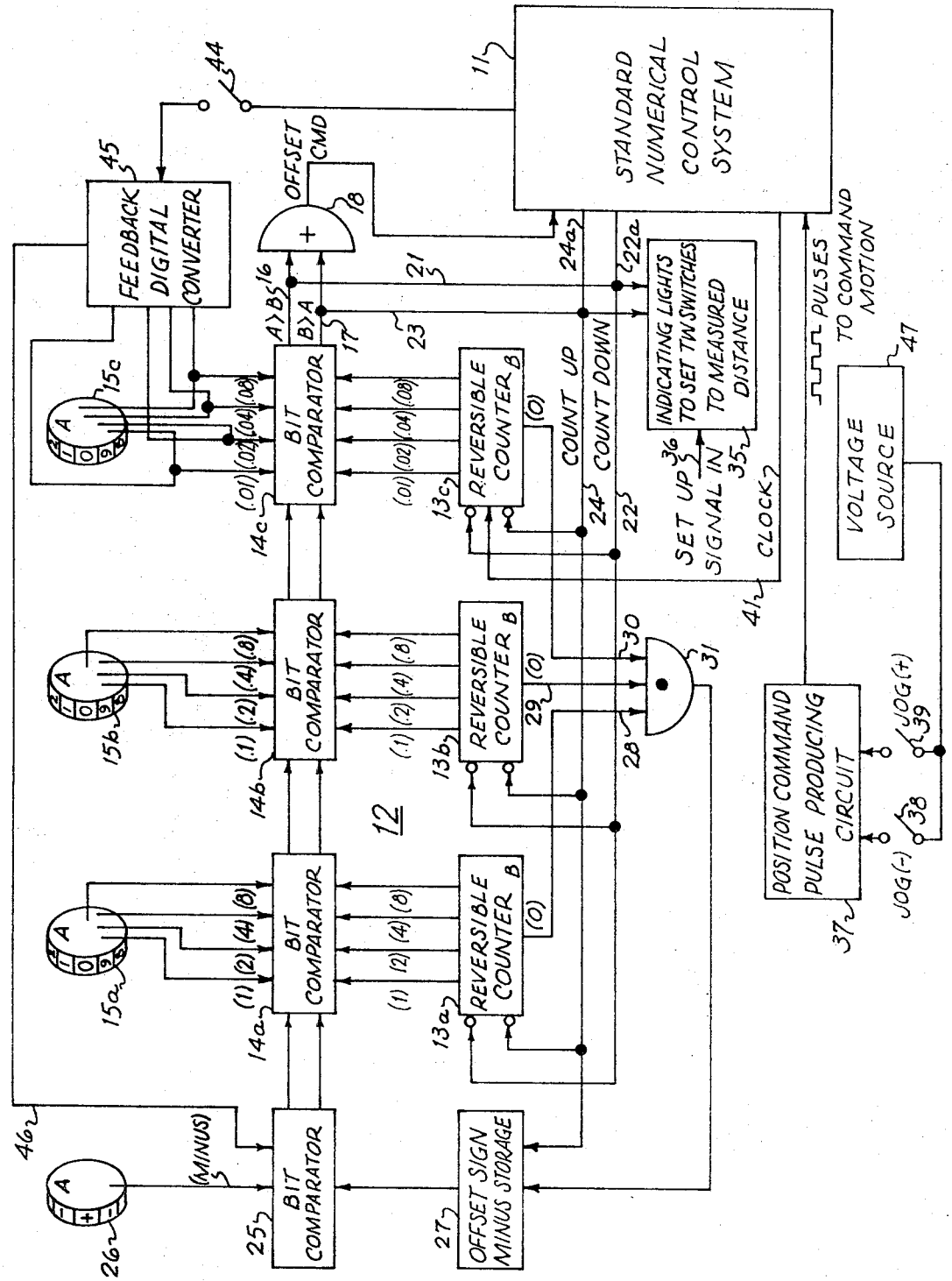
FIG. 1 of the drawings is a functional block diagram of a new and improved numerical control system including an offset count-in control constructed in accordance with the invention.

In operation, the bit comparators 14a—14c serve to compare the binary-coded decimal digit value supplied thereto from their associated reversible counters 13a—13c to a desired new input value supplied thereto from the thumbwheel switches 15a—15c, and to derive a count-adjusting output signal indicative of a difference and polarity of any difference. As will be more apparent hereinafter, the count stored in the reversible counters 13a—13c is representative of the value of the offset currently being employed by the standard numerical control system 11. Hence, the count-adjusting output signal derived by the bit comparators 14a—14c is actually representative of a difference in magnitude and/or polarity of the existing offset value and the desired new input offset value determined by the setting of the thumbwheel switches 15a—15c. This count-adjusting output signal is supplied from the output of the least significant bit comparator 14c over the conductors 16 and 17 to standard numerical control system 11 through an OR gate 18. In the event that the new input offset value, which shall be identified as value A, is greater than the existing offset value B, then the count-adjusting output signal will appear across the conductor 16. In the event that the existing offset value B is greater than the new input value A, the count-adjusting output signal will be supplied across the conductor 17.

From an examination of FIG. 1, it will be seen that the output conductor 16 is connected over a conductor 21 to a count-up conductor 22 that in turn is connected to the count-up input terminals of each of the reversible counter stages 13a. Similarly, the conductor 17 is connected through a conductor 23 to a countdown conductor 24 that in turn is connected to the countdown input terminals of each of the reversible counter stages 13a—13c. Accordingly, it will be appreciated that in the event that the new input offset value is greater than the current value being employed by the standard numerical control system 11, the input offset value A will be greater than the existing value B and a count-up-adjusting output signal will be derived from the least significant bit comparator stage 14c that is supplied over the conductors 21 and 22 to cause the reversible counter stages 13a—13c to count up until the count stored in these reversible counter stages is equal to the new count read into the bit comparator stages 14a—14c from the thumbwheel switches 15a—15c. Similarly, in the event that the new input offset value is less than the existing offset value currently being used by the standard numerical control system, a countdown-adjusting output signal is developed which is supplied over the conductors 17, 23 and 24 to cause the reversible counter stages 13a—13c to be counted down into correspondence with the values supplied from the thumbwheel switches 15a—15c.

The count-adjusting output signals derived from the least significant bit comparator stage 14c are also supplied over the conductors 24a and 22a to the x and y axis command phase counters of the standard numerical control system 11. In the event that the standard numerical control system 11 corresponds to the control system described in U.S. Pat. No. 3,120,603, the countdown and count-up adjusting output signals supplied over conductors 24a and 22a, respectively, would be applied to the X- and Y-axis command phase counters of the numerical control system 11.

Figure 2B:
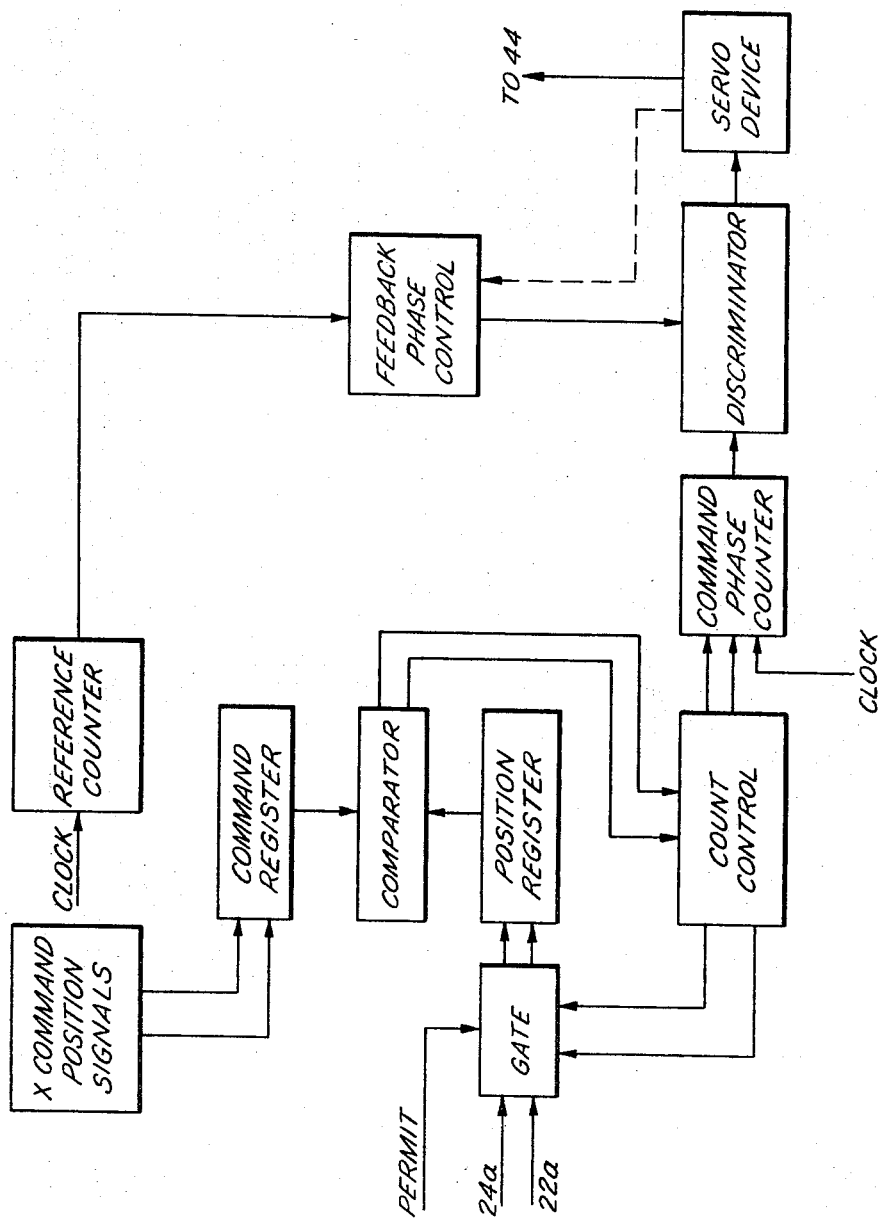

Briefly, as shown in FIG. 2a, the details of the numerical control system 11 comprise in a normal numerical control system, as set forth in U.S. Pat. No. 3,120,603, a command phase counter and the reference counter. In order to control the positioning of an object, there is provided a train of position pulses wherein each pulse is indicative of the discrete amount of movement of the object to be positioned. A source of clock pulses are furnished to a reference phase counter which responds to these clock pulses to provide first signals. A command phase counter responds to the clock pulses and also to the commanded position pulses to provide second signals whose phase with respect to the first signals varies as a function of the number of pulses in the train. A phase discriminator responds to the phase difference between the first and second signals to position the object through a servo drive mechanism. This servo drive mechanism normally involves a motor for positioning a machine tool shaft and the information with respect to the instantaneous position of this shaft is fed back as shown in dotted line form to the feedback phase control. In one particular application, the feedback phase control comprises a resolver whose stator is energized with signals from the reference counter and whose rotor is adjusted in accordance with the feedback signal received from the servo drive. The resultant resolver output is then supplied to the discriminator which compares this signal with the signal from the command phase counter to provide an error signal indicating the difference between the commanded signal and the actual position of the movable object. In the event that the standard numerical control system 11 comprises a system which contains absolute position registers such as the Mark 120 numerical-positioning control system manufactured and sold by the General Electric Co., the count-adjusting output signals supplied over conductors 24a and 22a may be applied directly to the position registers of the numerical control system as shown in block diagram form in FIG. 2b of the application. Briefly, this system compares to the previously mentioned system 2a except that the arrangement of 2b is directed to an absolute positioning system whereas the arrangement of FIG. 2a was applicable to an incremental positioning system. In the arrangement of FIG. 2b, the position information is fed to a command register, a position register instantaneously representing the last-commanded position furnished to the numerical control. The outputs of the command register and position register are compared and fed to a control circuit whose output updates the count in the position register to include the additional command information available from the command register and in addition, controls the command phase counter to modify its phase to accommodate the new commanded position information. The arrangement of FIG. 2b otherwise operates comparably to that described with respect to 2a. In both FIGS. 2a and 2b, a gate is provided for gating in the difference value of the offset information available from leads 22a and 24a of FIG. 1. These two signals as shown in 2a and 2b are applied to appropriate gate circuits and the difference offset data is employed to modify numerical control operation in response to a permit signal available from 18 of FIG. 1.

In both instances, therefore, the arrangement of FIG. 1 produces the desirable offset difference data and utilizes it to modify the phase of the command phase counter output with respect to the reference counter output in addition to the modification of such phase by the commmanded position data. For further details of the operation of an absolute or an incremental positioning numerical control system, reference may be made to the aforesaid U.S. Pat. No. 3,120,603 directed to an incremental positioning system and to U.S. Pat. No. 3,400,314 issued Sept. 3, 1968 to W. P. Wilson for a "Numerical Positioning Control System" — assigned to the General Electric Co. and relating to an absolute positioning system. These position registers constitute reversible counters similar to those shown at 13a—13c, and will be counted up or counted down in accordance with the input count-adjusting signals supplied thereto over the conductors 24a or 22a. From this description, it will be appreciated therefore that the count-adjusting output signal derived from the bit comparators 14a—14c serves not only to readjust the count stored in the reversible counters 13a—13c, but also serves to correct or update the offset value being employed currently by the standard numerical control system.

In order for the bit comparators 14a—14c to know whether to produce a countdown or a count-up adjusting output signal for a change in sign signal from 26, offset value sign-indicating circuit means are included in the offset count-in control circuit 12 and are comprised by a sign bit comparator 25 having a first input connected to the output of an offset sign storage circuit means 27. The offset sign storage circuit 27 comprises an additional stage or decade of the reversible counter comprised by the decade stages 13a—13c so that the system accommodates the plus and minus sign directions simply by treating them as more significant digit of the offset. For this purpose, each of the reversible counter stages 13a—13b in conjunction with the bit comparators 14a—14c have their zero reference-indicating output terminals shown at 28—30, respectively connected as the inputs to an AND gate 31 whose output is provided as a count-adjusting input to the offset sign storage circuit 27. Thus, it will be appreciated that the sign-indicating thumbwheel switch 26, the sign bit comparator 25, and the offset sign storage circuit 27 will function as a more significant stage of the overall offset count-in control, and will operate to develop plus or minus output signals that are supplied to the bit comparators 14a—14c to cause them to produce either countdown or count-up count-adjusting output signals as determined by the setting of the sign-indicating thumbwheel switch 16. During operation of the offset count-in control, upon the count stored in each of the decade reversible counters 13a—13c being counted to a zero, zero reference output-indicating signals will be produced over the conductors 28—30, that will enable the AND gate 31 to count the offset sign storage circuit 27 into a condition such that it corresponds with the setting of the sign-indicating thumbwheel switch 26 if there is no correspondence. If there is correspondence of sign between 26 and 27, comparator 25 means indicates there is a comparison and that digit is ignored. If there is no correspondence, the output of 25 causes a countdown signal to appear on 17. The counters will then continue to count until all digits in the counter are identical to the digits of the thumbwheels, thereby terminating further count-up or countdown.

In many instances, the value of a particular offset to be used in conjunction with a machine tool working position, will not be known. In instances such as these, it is desirable to provide some means for readily determining the exact value of the offset for the particular machine tool position in question. For this purpose, indicator means are provided which are comprised by a set of indicating lights shown at 35 which are connected to the respective countdown and count-up supply conductors 24 and 22 and also are connected to a source of setup signals indicated at 36 for resetting the count in the control circuit to a condition where the count stored in the reversible counters 13a—13c is reset to zero value. In addition to the indicating light circuit 35 and suitable setup signal circuitry established by the setup signal supplied through the conductor 36, a position command pulse-producing circuit shown at 37 is provided which has its output connected to the input to the command phase counters for both the X- and Y-axis for the standard numerical control system 11. The position command pulse-producing circuit 37 is activated by either a jog minus or jog plus manually operated control switches down at 38 and 39 for causing the position command pulse-producing circuit 37 to produce pulses that are applied to the command phase counters to cause them to position the automatic machine tool being controlled by the standard numerical control system 11 in discrete jogging steps up or down from an initial reference position. The initial reference position is one to which the standard numerical control system 11 can easily and readily position the machine tool working head in response to a set of input command signals supplied to its position registers, or in the event that the system does not employ such position registers, in response to input position command signals that are supplied to its X- and Y-axis distance counters. The numerical control system will then operate satisfactorily to place the machine tool in this initial reference position.

Upon being thus positioned, the operator of the equipment then by visually observing the position of the machine tool working head relative to the working piece can selectively actuate the jog minus or jog plus switches 38 and 39 coupled to source 47 to jog the working head of the machine tool into an appropriate contact position with the surface of the workpiece. Concurrently with the positioning of the machine tool in this appropriate working position, adjusting pulses are supplied back from the X- and Y-axis distance counters of the numerical control system 11 and are supplied over a conductor 41 to the input of the least significant reversible counter 13c to cause the reversible counters to be counted up or down from their initial reset condition. Hence, it will be appreciated that upon the working head of the machine tool being jogged into an appropriate contact position with respect to the workpiece, the count accumulated in the reversible counters 13a—13c will in actuality represent the desired offset value from the initial reference position to which the standard numerical control system 11 could easily and readily position the machine tool working head as a consequence of its internal operation. Thereafter, the unknown offset value can be readily determined by manipulating the thumbwheel switches 15a—15c to cause their setting to correspond to the count contained in the reversible counters, and subsequently reading of the settings of the thumbwheel switches. During this setting and reading of the thumbwheel switches, the indicating lights 35 will provide an indication to the operator that the bit comparators 14a—14c are continuing to provide count-adjusting output signals to the indicating lights and to provide an indication of the direction in which the thumbwheels must be changed to cause their setting to correspond to the count contained in the reversible counters. It is, of course, imperative that these count-adjusting output signals not be supplied back to the reversible counters while operating in this mode, otherwise the offset value count accumulated in the reversible counters would be upset. Accordingly, while thus operating, the count-adjusting output signals appearing at the output of the bit comparator 14c are disconnected, as by appropriate logic circuitry between leads 23, 24 and between 21, 22, from the reversible counters 13a—13c. Thereafter, upon the thumbwheel switches 15a—15c being appropriately set so that their setting corresponds to the reading on the reversible counters 13a—13c, the reading set into the thumbwheel switches can be utilized to record and thereby establish the previously unknown offset value. With this information, during subsequent working of the machine tool, if it is ever necessary to return to that particular machine tool working position, the necessary offset value will have been predetermined, and can be readily set into the thumbwheel switches 15a—15c for appropriately controlling the numerical control system 11.

It is also desirable under certain conditions to provide some means for automatically and continuously adjusting the offset value being employed in conjunction with a particular program. For this purpose, feedback circuit means are provided which include a selectively operable switch shown at 44 for completing feedback connection from the numerical control system 11 to a feedback digital converter 45 that has its output connected to the new value input terminals 0.01, 0.02, 0.04 and 0.08 of the least significant bit comparator 14c or any other digit or digits. Concurrently, the feedback digital converter derives a sign-indicating feedback signal that is supplied over a conductor 46 back to the sign-indicating bit comparator 25 for use in place of the sign-indicating signal normally obtained from the sign-indicating thumbwheel switch 26. When operating in the feedback mode wherein the selectively operable feedback switch 44 is closed the automatically and continuously fed back adjusting signals are employed with the input offset values supplied from the thumbwheel switches 15a—15c being inactive. Otherwise, the system while operating in the feedback mode will function in substantially the same manner as described hereinbefore where it was considered that the new input offset value was being read into the system through the medium of the thumbwheel switches 15a—15c and 26.

From the foregoing description, it will be appreciated that the present invention provides a means for reading in only the difference between two offset values into a numerical control system in a minimum time period with a relatively low cost, minimum amount of equipment and without requiring any external inputs to command the system to correct itself although they may be used. In effect the invention makes it possible for a numerical control system to be able at all times to check a stored offset value against an input value to determine whether or not a change is required, and if a change is called for, to make the necessary change. The new and improved numerical control system makes available a novel offset value count-in control for comparing the current working value of an offset being used by the numerical control system against an input value, and for counting into the system a count indicative of the magnitude and polarity of any difference between the existing offset value currently being used by the numerical control system and the desired input offset value.

To allow counting in offset dimensions from a continuously variable source, from which the information is available in digital form and which may be varied by changing one digit at a time or all digits simultaneously, the novel offset count-in control utilizes a system of reversible counters and bit comparators. The reversible counters store at all times the current offset and the comparators compare digit by digit the current offset with the input offset. Upon the comparison circuits indicating that the input offset differs from the current offset, the reversible counters are commanded to count up or down dependent upon which of the two numbers is larger. That is to say, if the input offset is larger than that stored in the reversible counters, the reversible counters will be commanded to count up. The same command is also used to count the offset into the numerical control system. Additionally, the plus and minus sign directions are inserted simply by treating the plus and minus sign directions as a more significant digit of the offset.

Having described one embodiment of a new and improved numerical control system and offset value count-in control therefore constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What I claim as new and desired to be secured by Letters Patent of the United States is:

1. An arrangement for controlling the position of an object in response to a train of commanded position pulses comprising means responsive to the positioning of said object to produce a train of measurement pulses wherein each pulse is indicative of a discrete amount of movement of said object, a source of clock pulses, a reference phase counter responsive to said clock pulses to provide first signals, a command phase counter responsive to said clock pulses and said commanded position pulses to provide second signals whose phase with respect to said first signals varies as a function of the number of pulses in said train, means comprising a phase discriminator responsive to the phase difference between said first and second signals to position said object, means for providing an offset control for said numerical control comprising reversible counter means for storing data indicative of a current offset value being employed by said numerical control system with which the offset count-in control is used, comparator means having a first input coupled to a value indicating output from the reversible counter means, means for supplying data indicative of a new offset value to a second input of the comparator means, the comparator means serving to compare the existing offset value set into the reversible counter means to the new offset value and to derive a count-adjusting output signal indicative of a difference and polarity of any such difference, means for feeding the count-adjusting output signal from the comparator means back to a count-adjusting input to the reversible counter means for adjusting the count contained therein to a value corresponding to the new offset value, and means responsive to the count-adjusting output signal from the comparator means for modifying the phase of said second signal as a function of said count of adjusting output signal, the offset value being employed by such system to the new offset value.

2. An offset count-in control according to claim 1 further including offset value sign-indicating circuit means responsive to said reversible counter means indicating a zero count coupled to and controlling the comparator means for indicating to the comparator means a different direction or polarity of a new offset value.

3. An offset count-in control according to claim 1 wherein the means for supplying the data indicative of a new offset value to a second input of the comparator means comprises a plurality of thumbwheel switches for providing data indicative of the magnitude of a new offset value to be used by the control, there being a thumbwheel switch for each decade of the reversible counter means.

4. An offset count-in control according to claim 1 wherein the means for supplying data indicative of a new offset value to a second input of the comparator means comprises a plurality of thumbwheel switches for providing data indicative of the magnitude of a new offset value to be used by the control, there being a thumbwheel switch for each decade of the reversible counter means, and further including offset value sign-indicating circuit means coupled to and controlling the comparator means for indicating to the comparator means any difference in direction or polarity of a new offset value.

5. An arrangement for controlling the position of an object in response to a train of commanded position pulses comprising means responsive to the positioning of said object to produce a train of measurement pulses wherein each pulse is indicative of a discrete amount of movement of said object, a source of clock pulses, a reference phase counter responsive to said clock pulses to provide first signals, a command phase counter responsive to said clock pulses and said commanded position pulses to provide second signals whose phase with respect to said first signals varies as a function of the number of pulses in said train, means comprising a phase discriminator responsive to the phase difference between said first and second signals to position said object, an offset value count-in control means for adjusting the current value of an offset count signal being used by the numerical control system to a new value offset count signal comprising means responsive to the difference and polarity of the difference between the current offset value count signal currently employed by the numerical control system and the desired new value offset count signal for further modifying the phase of said second signal with respect to said first signal.

6. A numerical control system according to c/aim 5 wherein the offset value count-in control means includes a plurality of thumbwheel switches for supplying data indicative of the magnitude of a new offset value to be used by the numerical control system, and further includes offset value sign-indicating circuit means comprised by a sign-indicating thumbwheel switch for indicating any difference in the direction or polarity of a new offset value.

7. A numerical control system according to claim 5 further including selectively operable feedback circuit means interconnected between an output of the numerical control system and an input to the offset count-in control means for supplying new offset values derived automatically and continuously during the operation of the numerical control system back to the offset count-in control means.

8. A numerical control system according to claim 5 further including indicator means coupled to the offset value count-in control means for indicating that the offset value count-in control means has completed adjustment of the numerical control system to a commanded new offset position, and position command pulse-producing means coupled to and adapted to control the numerical control system to cause it to jog a machine tool being controlled into a desired position corresponding to an unknown offset position.

9. A numerical control system according to claim 5 wherein the offset value count-in control means includes a plurality of thumbwheel switches for supplying data indicative of the magnitude of a new offset value to be used by the numerical control system, and further includes offset value sign-indicating circuit means comprised by a sign-indicating thumbwheel switch for indicating to the offset value count-in control means any difference in the direction or polarity of a new offset value, selectively operable feedback circuit means interconnected between an output of the numerical control system and an input to the offset count-in control means for supplying new offset values derived automatically and continuously during the operation of the numerical control system back to the offset count-in control means, and indicator means coupled to the offset value count-in control means for indicating the direction of thumbwheel adjustment to enable the offset value count-in control means to complete the adjustment of the numerical control system to a commanded new offset position, and position command pulse-producing means coupled to and adapted to control the numerical control system to cause it to jog the machine tool into a desired position corresponding to an unknown offset position when the thumbwheel inputs only are being used.

10. A numerical control system according to claim 5 wherein the offset value count-in control means comprises reversible counter means for storing data indicative of a current offset value being employed by the numerical control system, comparator means having a first input coupled to a value-indicating output from the reversible counter means, means for supplying data indicative of a new offset value to a second input of the comparator means, the comparator means serving to compare the existing offset value set into the reversible counter means to the new offset value and to derive a count-adjusting output signal indicative of a difference and polarity of any such difference, means for feeding the count-adjusting output signal from the comparator means back to a count-adjusting input to the reversible counter means for adjusting the count contained therein to a value corresponding to the new offset value, and means for supplying the count-adjusting output signal from the comparator means to the numerical control system for adjusting the offset value being employed by such system to the new offset value.

11. A numerical control system according to claim 10 wherein the means for supplying data indicative of a new offset value to a second input of the comparator means comprises a plurality of thumbwheel switches for providing data indicative of the magnitude of a new offset value to be used by the control, there being a thumbwheel switch for each decade of the reversible counter means, and further including offset value sign-indicating circuit means coupled to and controlling the comparator means for indicating to the comparator means any difference in direction or polarity of a new offset value.

12. A numerical control system according to claim 10 further including selectively operable feedback circuit means interconnected between a sensor associated with the process and the new offset value data input to the comparator means for supplying new offset values derived automatically and continuously during the operation of the numerical control system back to the offset count-in control means.

13. A numerical control system according to claim 10 further including indicator means coupled to the output from the comparator means for indicating that the offset value count-in control means has completed adjustment of the numerical control system to a commanded new position upon the discontinuance of the count-adjusting output signals, and position command pulse-producing means coupled to and adapted to control the numerical control system for causing it to jog a machine tool into a desired position corresponding to an unknown offset position while simultaneously counting the reversible counters in the offset count-in control to a setting corresponding to the unknown offset value measured with respect to a readily attainable machine tool reference working position.

14. A numerical control system according to claim 10 wherein the means for supplying data indicative of a new offset value to a second input of the comparator means comprises a plurality of thumbwheel switches for providing data indicative of the magnitude of a new offset value to be used by the control, there being a thumbwheel switch for each decade of the reversible counter means, and further including offset value sign-indicating circuit means coupled to and controlling the comparator means for indicating to the comparator means any difference in direction or polarity of a new offset value, and further including indicator means coupled to the output from the comparator means for indicating the direction of thumbwheel adjustment to enable the offset value count-in control means to complete the adjustment of the numerical control system to a commanded new position upon the discontinuance of the count-adjusting output signals, and position command pulse-producing means coupled to and adapted to control the numerical control system for causing it to jog a machine tool into a desired position corresponding to an unknown offset position while simultaneously counting the reversible counters in the offset count-in control to a setting corresponding to the unknown offset value measured with respect to a readily attainable machine tool reference working position whereby the unknown offset position can be determined by setting the thumbwheel switches to correspond to the count contained in the reversible counters and reading off the settings of the thumbwheel switches.

15. A numerical control system according to claim 14 further including selectively operable feedback circuit means interconnected between a sensor associated with the process and the new offset value data input to the comparator means for supplying new offset values derived automatically and continuously during the operation of the numerical control system back to the offset count-in control means.